US012811073B2

(12) United States Patent
Vallee et al.

(10) Patent No.: US 12,811,073 B2
(45) Date of Patent: Nov. 24, 2026

(54) EXHAUST GRID FOR AN ARC EXTINGUISHING DEVICE

(71) Applicant: Schneider Electric Industries SAS, Rueil Malmaison (FR)

(72) Inventors: Robin Vallee, Grenoble (FR); Denis Giraud, Saint-Martin-d'Hères (FR); Thomas Tilmant, Saint-Martin-d'Hères (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 322 days.

(21) Appl. No.: 18/442,388

(22) Filed: Feb. 15, 2024

(65) Prior Publication Data

US 2024/0290558 A1 Aug. 29, 2024

(30) Foreign Application Priority Data

Feb. 24, 2023 (EP) .................................... 22305250

(51) Int. Cl.
*H01H 9/34* (2006.01)

(52) U.S. Cl.
CPC .................................. *H01H 9/342* (2013.01)

(58) Field of Classification Search
CPC ........ H01H 9/342; H01H 9/345; H01H 9/346; H01H 9/36; H01H 9/362; H01H 2009/365; H01H 2009/348; H01H 78/18
(Continued)

(56) References Cited

U.S. PATENT DOCUMENTS 2,293,452 A * 8/1942 Boehne .................... H01H 9/34 218/34
2,468,422 A * 4/1949 Wood ....................... H01H 9/36 218/34
(Continued)

FOREIGN PATENT DOCUMENTS

DE 102009056190 B3 5/2011
EP 1498921 A1 1/2005
(Continued)

OTHER PUBLICATIONS

Chen, Degui et al., "Effect of Different Vent Configurations on the Interruption Performance of Arc Chamber", IEICE Transactions on Electronics, Institute of Electronics, Information and Communication Engineers, vol. E93-C, No. 9, Sep. 1, 2010, pp. 1399-1403.
(Continued)

*Primary Examiner* — William A Bolton
(74) *Attorney, Agent, or Firm* — Wolf, Greenfield & Sacks, P.C.

(57) ABSTRACT

An arc extinguishing device for a circuit-breaker, including an arc splitter stack. The arc splitter stack including a plurality of extinguishing splitter plates stacked on top of each other and being kept apart from each other in the direction of stacking. The arc extinguishing device including an insulating rear plate being fixed at the back of the arc splitter stack, the insulation rear plate being subdivided into a first and a second vertical portions, each vertical portion including respectively a first and a second exhaust zone, each exhaust zone including one or more vents facing spaces between two adjacent extinguishing splitter plates, the first exhaust zone being located in an upper part of the first portion, the second exhaust zone being located in a lower part of the second portion.

20 Claims, 5 Drawing Sheets

(58) Field of Classification Search
USPC .... 218/149, 15, 34, 35, 38, 46, 52, 81, 103, 218/105, 106
See application file for complete search history.

(56) References Cited

U.S. PATENT DOCUMENTS

| | | | | | |
|---|---|---|---|---|---|
| 2,643,314 | A | | 6/1953 | Ridgley | |
| 2,947,839 | A | * | 8/1960 | Reilly | H01H 9/342 218/34 |
| 3,327,080 | A | * | 6/1967 | Meinders | H01H 9/34 218/149 |
| 10,381,180 | B1 | * | 8/2019 | Ferree | H01H 9/36 |

FOREIGN PATENT DOCUMENTS

| | | | |
|---|---|---|---|
| EP | 4064307 | A1 | 9/2022 |
| EP | 4113559 | A1 | 1/2023 |
| JP | 6210831 | A | 1/1987 |

OTHER PUBLICATIONS

European Search Report and Search Opinion dated Jul. 28, 2023 for corresponding European Patent Application No. EP23305250.5,10 pages.

* cited by examiner

EXHAUST GRID FOR AN ARC EXTINGUISHING DEVICE

FIELD OF THE INVENTION

The present invention relates to the domain of miniature circuit breakers, and more particularly to an arc quenching device comprised in a miniature circuit breaker for the purpose of rapidly extinguishing any electric arc which may have been formed upon the occurrence of a circuit interruption.

The present invention relates in particular to an insulating rear plate adapted to be fixed at the back of an arc chute.

BACKGROUND OF THE INVENTION

A circuit breaker is an electrical safety device designed to protect an electrical circuit connected to the circuit breaker from possible damages caused by an electrical default, for example an overcurrent, a short circuit, etc. The main function of a circuit breaker is to automatically interrupt the electrical circuit, i.e. to open the circuit, by moving apart two contacts when a default is detected.

A miniature circuit breaker (or "MCB") is an electromagnetic device that embodies a complete enclosure of a circuit breaker inside a molded insulating material.

An electric arc (hereafter "arc") may be generated inside a miniature circuit breaker when the two contacts are separated to interrupt (open) the circuit. Miniature circuit breakers use air alone to extinguish the arc. In this case, electric arcs, generated when two contacts are separated to interrupt the circuit, are electric currents that go from one contact to the other through ionized air. Circuit breakers contain so-called arc chutes, a stack of mutually insulated parallel metal plates that divide and cool the arc, thus permitting the cooling and evacuation of the ionized air. By splitting the arc into smaller arcs, the arc is cooled down while the arc voltage is increased and serves as an additional impedance that limits the current through the circuit breaker. Such arc extinguishing device have been well known for years, as illustrated for example in U.S. Pat. No. 2,643,314 filed in the 1950s.

Ionized air is evacuated through the arc chute and may then exit the miniature circuit breaker through ventilation openings (or exhaust vents). It is however important to prevent any electric arc to reappear behind the arc chute as it may damage the circuit breaker.

German patent DE 10 2009 056 190 filed in 2009 discloses an arc extinguishing device for an electrical switching device such as a miniature circuit breaker. As explained in this document in paragraph [0007], "Die Lichtbogenlöschgase enthalten ionisierte Bestandteile, wodurch es bei bekannten Lichtbogenlöscheinrichtungen insbesondere bei hohen Kurzschlussströmen im Ableitbereich der Lichtbogenlöschgase zu Überschlägen sowie zu gegenseitiger Beeinflussung kommen kann", or, translated in English, "the arc extinguishing gases contain ionised components, which can lead to flashovers and mutual interference in known arc extinguishing devices, especially with high short-circuit currents in the discharge area of the arc extinguishing gases".

According to the disclosure of German patent DE 10 2009 056 190, in order to prevent such problems, a dividing wall divides the exhaust air flow of the arc-extinguishing gases emerging from the ventilation openings into a first and a second partial exhaust air flow, with the partial exhaust air flows running in opposite directions.

This is illustrated in FIG. 1 of the document DE 10 2009 056 190, which is reproduced (with some minor amendments) as FIG. 1 in present document. FIG. 1 is a representation of an arc extinguishing device according to the state of the art.

FIG. 1 shows an arc extinguishing device 1, for example for a miniature circuit-breaker, comprising an arc extinguishing chamber 2, the arc extinguishing chamber 2 comprising a plurality of arc splitter plates 4 stacked on top of each other, forming an arc splitter stack 3, and being kept apart from each other in the direction of stacking. The arc splitter stack 3 is arranged between an upper arc guide rail 19 and a lower arc guide rail 20, which run parallel to the plurality of arc splitter plates 4 and form the upper and lower limits of the arc splitter stack 3. When the arc extinguishing device 1 is installed in a device such a miniature circuit breaker, each of the two contacts of the circuit breaker that can be separated to interrupt the circuit may be connected to either the upper arc guide rail 19 or the lower arc guide rail 20 respectively. When the two contacts are separated to open the circuit, an electric arc may be generated in the arc extinguishing chamber 2 and may enter the arc splitter stack 3 via the arc inlet side 23. Exhaust air produced by the burning electric arc is dissipated via the arc outlet side, opposite to the arc inlet side 23, that is to say, in FIG. 1, in the right side of the arc extinguishing device 1. According to the disclosure of DE 10 2009 056 190, a rear plate 5 is fixed at the rear of the arc splitter stack 3, the rear plate comprising openings 6, 6' to let the exhaust air flows outside the arc splitter stack 3. This rear plate 5 comprises a partition wall 7 and redirect the outgoing exhaust air from openings 6 and 6' according to two opposite air flows 8 and 9.

According to the cause of the formation of the electric arc, exhaust air outgoing through the rear plate 5 may still comprise ionized air and an electric arc may reform itself at the rear of the arc splitter stack 3, reducing the effectiveness of the arc extinguishing device 1 and possibly causing damages to the device comprising the arc extinguishing device 1 or, even worst, possibly initiating an electric arc with the outside of the arc extinguishing device 1 through the air exhausts, which can present a security risk.

It is therefore an object of the present invention to improve the effectiveness and the security of the extinguishing of an electric arc by an arc extinguishing device, particularly by preventing the reappearance of an electric arc at the output of the arc extinguishing device.

Another object of the present invention is to provide an improved arc extinguishing device for a miniature circuit breaker.

SUMMARY OF THE INVENTION

The aforementioned objects are, at least partly, achieved by an arc extinguishing device for a circuit-breaker, comprising an arc splitter stack, the arc splitter stack comprising a plurality of extinguishing splitter plates stacked on top of each other and being kept apart from each other in the direction of stacking, the arc extinguishing device comprising an insulating rear plate fixed at the back of the arc splitter stack, the insulation rear plate being subdivided into a first and a second vertical portions, each vertical portion comprising respectively a first and a second exhaust zone, each exhaust zone comprising one or more vents facing spaces between two adjacent extinguishing splitter plates, the first exhaust zone being located in an upper part of the first portion, the second exhaust zone being located in a lower part of the second portion.

Advantageously, the exhaust air outgoing from the arc extinguishing device is split in two parts, the top and the bottom parts of the exhaust air being separated so that an electric arc cannot short cut the arc extinguishing device by reforming itself behind the insulating rear plate.

According to one embodiment, the first and second exhaust zone are separated by a vertical partition wall arranged to prevent exhaust air flow between the two exhaust zones.

According to one embodiment, each vertical portion comprises respectively a first and a second insulation zone, the first insulation zone being located in a lower part of the first portion, below the first exhaust zone, the second insulation zone being located in an upper part of the second portion, above the second exhaust zone.

According to one embodiment, the insulating rear plate comprises one or more positioning ribs adapted to be inserted between two adjacent extinguishing splitter plates.

According to one embodiment, the width of the first exhaust zone and the width of the second exhaust zone are different.

The invention also concerns a miniature circuit breaker comprising an arc extinguishing device as presently disclosed, the arc extinguishing device being placed in the miniature circuit breaker to extinguish an electric arc generated in an arc extinguishing chamber, the miniature circuit breaker being adapted to direct the exhaust air outgoing from the first exhaust zone to the arc extinguishing chamber.

Advantageously, the miniature circuit breaker can redirect the air flow exiting from the first exhaust zone inside the miniature circuit breaker toward the arc extinguishing chamber to create a circulation of air and help the insertion of the electric arc inside the arc splitter stack. Another advantage is to limit the amount of ionized air that can escape from the miniature circuit breaker by directing part of the air flow to the internal recirculation without penalizing the arc insertion. This avoids possible external ignition caused by ionized air outside the miniature circuit breaker.

According to one embodiment, the miniature circuit breaker is adapted to direct the exhaust air outgoing from the second exhaust zone to an exhaust vent of the miniature circuit breaker.

BRIEF DESCRIPTION OF THE DRAWINGS

Other characteristics and advantages shall appear in the following description of embodiments of the arc extinguishing device according to the invention, given by way of non-limiting examples, in reference to the annexed drawings wherein.

DETAILED DESCRIPTION OF SPECIFIC EMBODIMENTS

An exemplary embodiment of an arc extinguishing device 100 according to an exemplary embodiment of the present invention and of a miniature circuit breaker 500 comprising such arc extinguishing device 100 are shown in FIGS. 2 to 5.

A same coordinate system with X, Y and Z axes is represented in the FIGS. 2 to 5. The axe Y represents the vertical direction in the said figures.

Figure 1:
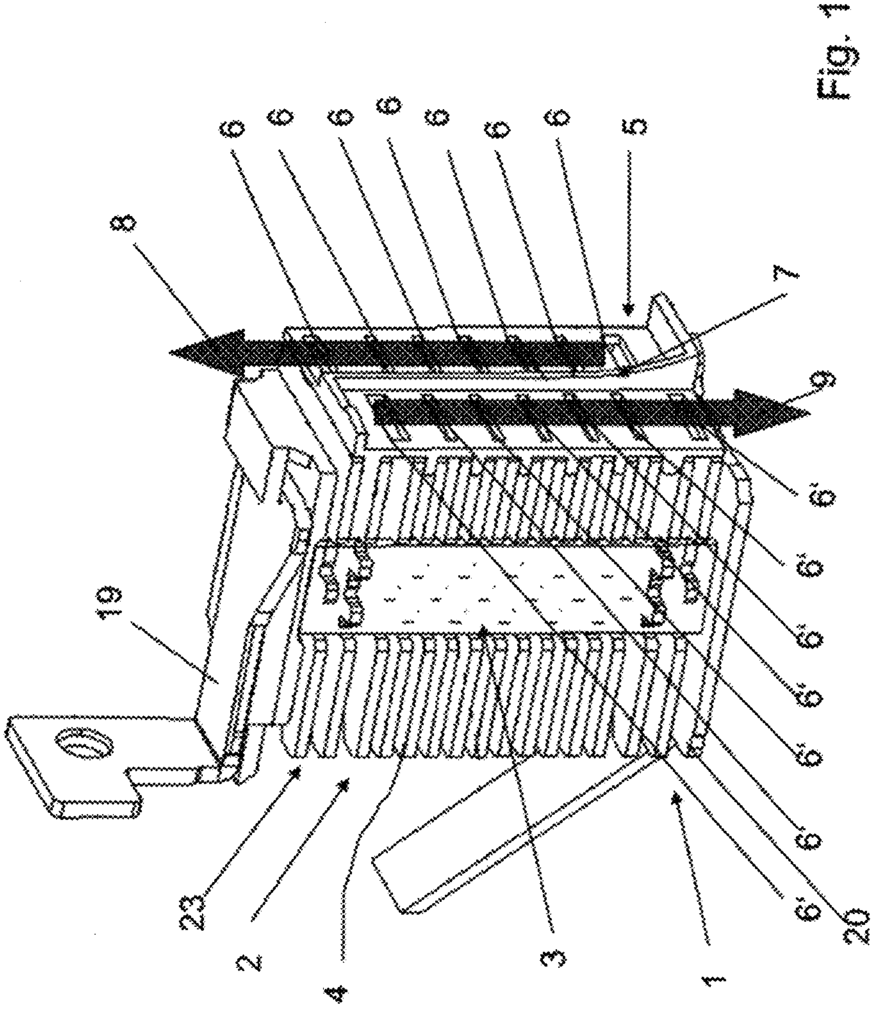
FIG. 1 is a representation of an arc extinguishing device known from prior art.

FIG. 1 has been previously described.

Figure 2:
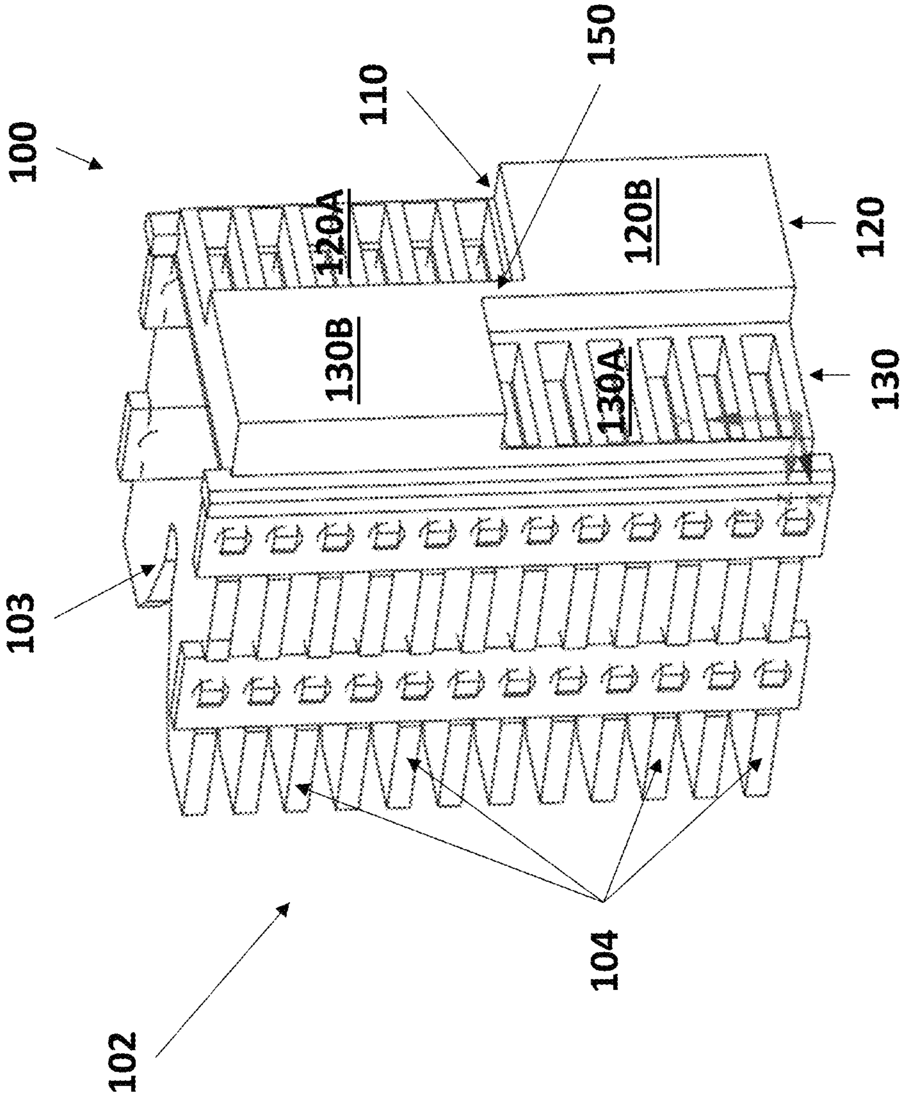
FIG. 2 is a representation of an arc extinguishing device according to an exemplary embodiment of the present invention.

FIG. 2 is a representation of an arc extinguishing device 100 according to an exemplary embodiment of the present invention.

The arc extinguishing device 100 mainly differs from the arc extinguishing device 1 previously described by an insulating rear plate 110. The arc extinguishing device 100 comprises a plurality of extinguishing splitter plates 104, forming an arc splitter stack 103. An extinguishing arc chamber 102, similar to the extinguishing arc chamber 2, is located in front of the arc extinguishing device 100. The insulating rear plate 110 is placed at the rear of the arc extinguishing device 100, more precisely the insulating rear plate 110 is fixed at the back of the arc splitter stack 103. The insulating rear plate 110 is possibly fixed to the arc splitter stack 103 via one or more positioning ribs as described hereafter.

The insulating rear plate 110 is subdivided into a first vertical portion 120 and a second vertical portion 130. The vertical portion 120 comprises a first exhaust zone 120A. The vertical portion 130 comprises a second exhaust zone 130A. Each exhaust zone 120A and 130A comprises one or more vents 140 facing spaces between two adjacent extinguishing splitter plates 104. Exhaust air coming from the electric arc generated in the extinguishing arc chamber 102, going through the plurality of extinguishing splitter plates 104 may exit through the vents 140 of one or the other exhaust zone 120A and 130A.

The first exhaust zone 120A is located in an upper part of the first portion 120. The second exhaust zone 130A is located in a lower part of the second portion 130. As shown in FIG. 2, the two exhaust zones 120A and 130A may overlap in the middle of insulating rear plate 110. According to another embodiment, the first exhaust zone 120A, the upper one, may go down more or less low in the first vertical portion 120. Similarly, the second exhaust zone 130A, the lower one, may go up more or less high in the second vertical portion 130. According to another embodiment, the two exhaust zones 120A and 130A may overlap in the lower and/or in the lower part of the insulating rear plate 110. According to another embodiment, the two exhaust zones 120A and 130A may not overlap.

According to one embodiment, the first exhaust zone 120A and the second exhaust zone 130A are separated by a partition wall 150 arranged to prevent exhaust air flow between the two exhaust zones 120A and 130A. Therefore, no air flow may occur between the two exhaust zones 120A and 130A, preventing the creation of an electric arc at the rear of the arc splitter stack 103.

According to one embodiment, each vertical portion 120 and 130 comprises respectively a first insulation zone 120B and a second insulation zone 130B. The first insulation zone 120B is located in a lower part of the first vertical portion 120, below the first exhaust zone 120A. The second insulation zone 130B is located in an upper part of the second vertical portion 130, above the second exhaust zone 130A. These insulation zones 120B and 130B are adapted to prevent any exhaust air flow. As shown in FIG. 2, the insulation zones 120B and 130B may fill in entirely the space behind the arc extinguishing device 100 when the arc extinguishing device 110 is placed inside a device such as a miniature circuit breaker, leaving no room for any air flow. In this case, the insulation zones 120B and 130B may be placed against the wall behind the arc extinguishing device 100. This ensures that exhaust air is only circulated through the air exhaust zone 120A and 130A. According to another embodiment, exhaust zones 120A and 130A may comprise partition walls preventing any exhaust air flow from an exhaust zone to the other exhaust zone or to any insulation.

Figure 3:
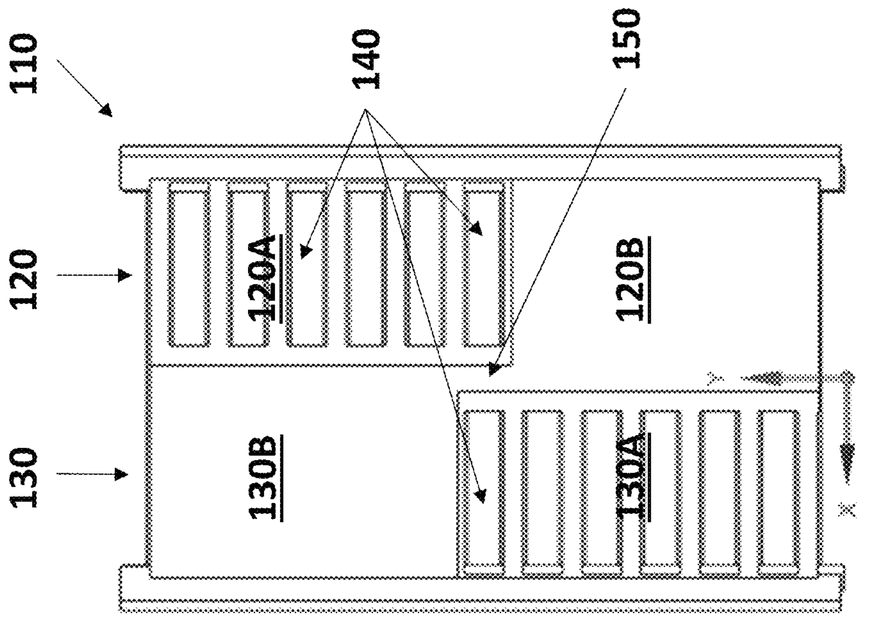
FIG. 3 is a representation of an insulating rear plate according to the exemplary embodiment of the present invention.

FIG. 3 is a representation of an insulating rear plate 110 according to the exemplary embodiment of the present invention. As in FIG. 2, the insulating rear plate 110 is subdivided into a first vertical portion 120 and a second vertical portion 130. The vertical portion 120 comprises the first exhaust zone 120A. The vertical portion 130 comprises the second exhaust zone 130A. Each exhaust zone 120A and 130A comprises one or more vents 140 facing spaces between two adjacent extinguishing splitter plates 104.

The two vertical portions 120 and 130 are here represented with a same width equal to half the width of the insulating rear plate 110.

According to another embodiment, the width of the insulating rear plate 110 may be shared differently between the two vertical portions 120 and 130, one vertical portion could be larger than the other. Thus, the width of the first exhaust zone 120A and the width of the second exhaust zone 130A are possibly not equal. Said otherwise, the two widths are possibly different. Possibly, the sum of the width of the first exhaust zone 120A and the second exhaust zone 130A is lower than the width of the insulating rear plate 110, the remaining width being occupied for example by the partition wall 150. This permits to configure the respective area of the two exhaust zones 120A and 130A and therefore configure the proportion of exhaust air going through each exhaust zone. This is another way of configuring the respective area of the two exhaust zones 120A and 130A along with configuring the respective lengths of the two exhaust zones 120A and 130A along the vertical axis.

As shown in FIG. 3- and FIG. 2-, a vent or opening 140 is facing each space between two adjacent extinguishing splitter plates 104. According to another embodiment, a vent may be facing only some of the spaces between two adjacent extinguishing splitter plates 104, for example one out of two. This is another possibility to configure the respective area of the two exhaust zones 120A and 130A allowing air flow, and therefore configure the proportion of exhaust air going through each exhaust zone.

Figure 4:
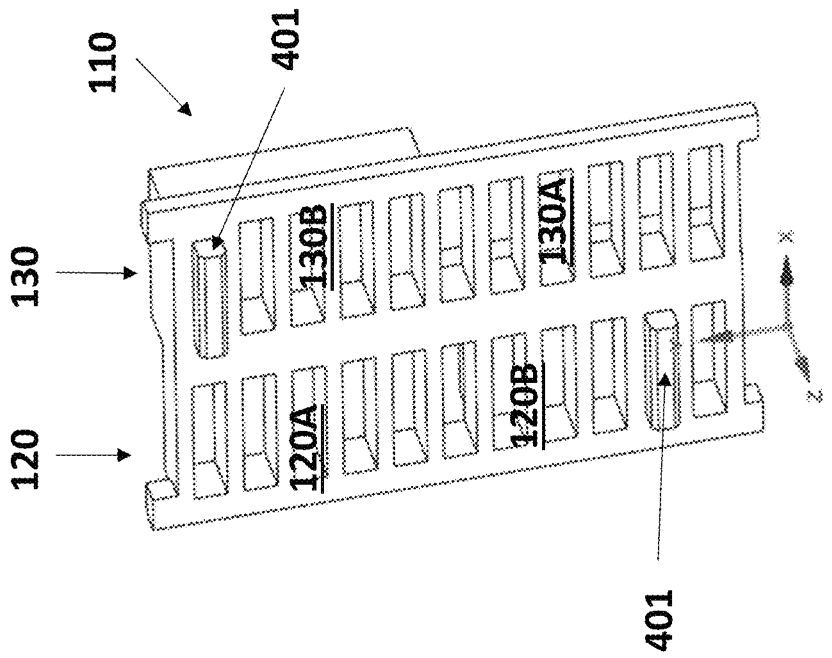
FIG. 4 is another representation of an insulating rear plate according to the exemplary embodiment of the present invention.

FIG. 4 is another representation of an insulating rear plate 110 according to the exemplary embodiment of the present invention. The insulating rear plate 110 is shown from behind, that is to say that the displayed portion is normally placed against the rear of the insulating rear plate 104. As shown, the insulating rear plate 110 may comprise one or more (here two) positioning ribs 401 adapted to be inserted between two adjacent extinguishing splitter plates 104 to position and fix the insulating rear plate 110 to the back of arc extinguishing device 100.

Figure 5:
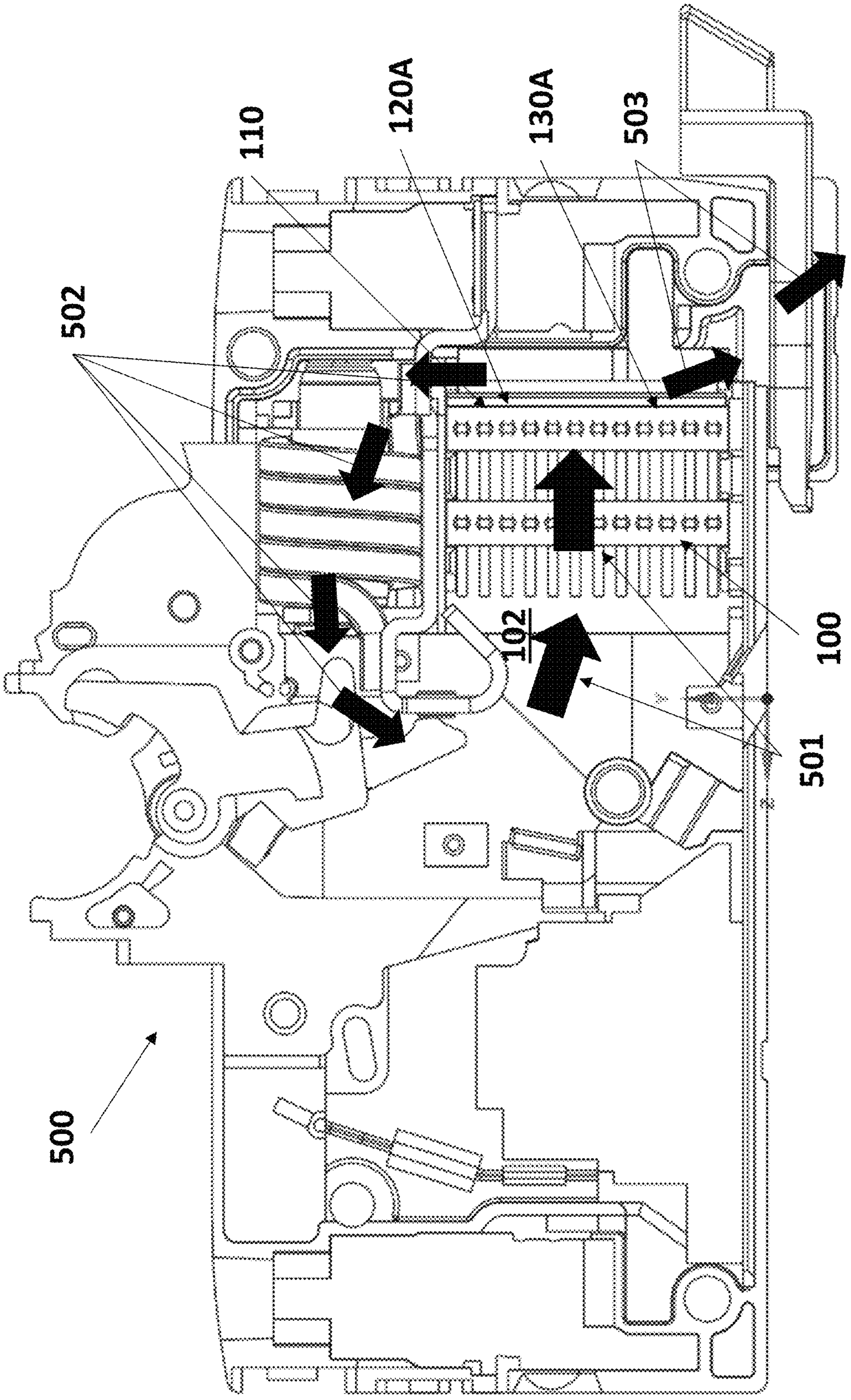
FIG. 5 is a representation of a miniature circuit breaker comprising an arc extinguishing device according to an exemplary embodiment of the present invention.

FIG. 5 is a representation of a miniature circuit breaker 500 comprising an arc extinguishing device 100 according to an exemplary embodiment of the present invention.

As illustrated, the extinguishing arc chamber 102 is located in front of the arc extinguishing device 100. The insulating rear plate 110 is placed at the rear of the arc extinguishing device 100. The flow of ionized air created by the electric arc following the opening of the contacts is directed toward the arc extinguishing device 100 as illustrated by the arrows 501. This flow of ionized air 501 comes out of the arc extinguishing device 100 by the air exhaust zone 120A and the air exhaust zone 130A, creating two flows of air. Arrows 502 represent the air flow coming out from the air exhaust zone 120A, that is to say the upper exhaust zone of the insulating rear plate 110. Arrows 503 represent the air flow coming out from the air exhaust zone 130A, that is to say the lower exhaust zone of the insulating rear plate 110.

Air flow coming out from the air exhaust zone 130A (arrows 503) is evacuated outside the miniature circuit breaker 500 through exhaust holes in the miniature circuit breaker 500.

Air flow coming out from the air exhaust zone 120A (arrows 502) recirculates inside the miniature circuit breaker 500 as illustrated in the FIG. 5 and comes back to the extinguishing arc chamber 102, creating a flow of air self-maintained, and improving the air flow 501, that is to say the evacuation of the ionized air from the extinguishing arc chamber 102. The exact circuit of the air flow illustrated by the arrows 503 depends of the internal architecture of the miniature circuit breaker 500.

As only a part of the ionized air is evacuated outside the miniature circuit breaker 500 through the air flow 503, it avoids, or at least highly reduces, possible external ignition caused by ionized air outside the miniature circuit breaker 500.

The invention claimed is:

1. A miniature circuit breaker comprising an arc extinguishing device for a circuit-breaker, the arc extinguishing device comprising:

an arc splitter stack, the arc splitter stack comprising a plurality of extinguishing splitter plates stacked on top of each other and being kept apart from each other in a direction of stacking, wherein:

an insulating rear plate is fixed at a back of the arc splitter stack, the insulating rear plate being subdivided into a first vertical portion and a second vertical portion, each of the first and second vertical portions comprising respectively a first and a second exhaust zone, each exhaust zone comprising one or more vents facing spaces between two adjacent extinguishing splitter plates, the first exhaust zone being located in an upper part of the first portion, the second exhaust zone being located in a lower part of the second portion, and wherein the arc extinguishing device is placed in the miniature circuit breaker to extinguish an electric arc generated in an arc extinguishing chamber, the miniature circuit breaker being adapted to direct an exhaust air outgoing from the first exhaust zone to the arc extinguishing chamber.

2. The miniature circuit breaker according to claim 1, wherein the first and second exhaust zone are separated by a vertical partition wall arranged to prevent exhaust air flow between the first and second exhaust zones.

3. The miniature circuit breaker according to claim 1, wherein each vertical portion comprises respectively a first and a second insulation zone:

the first insulation zone being located in a lower part of the first portion, below the first exhaust zone, the second insulation zone being located in an upper part of the second portion, above the second exhaust zone.

4. The miniature circuit breaker according to claim 3, wherein the first and second insulation zones fill entirely a space behind the arc extinguishing device when the arc extinguishing device is placed inside the miniature circuit breaker.

5. The miniature circuit breaker according to claim 1, wherein the insulating rear plate comprises one or more positioning ribs adapted to be inserted between two adjacent extinguishing splitter plates.

6. The miniature circuit breaker according to claim 1, wherein the first exhaust zone and the second exhaust zone have a same width.

7. The miniature circuit breaker according to claim 1, wherein the miniature circuit breaker is configured to:

direct the exhaust air outgoing from the second exhaust zone to an exhaust vent of the miniature circuit breaker.

8. The miniature circuit breaker according to claim 1, wherein the first exhaust zone and the second exhaust zone overlap in a middle of the insulating rear plate.

9. The miniature circuit breaker according to claim 1, wherein a vent faces each space between two adjacent extinguishing splitter plates.

10. The miniature circuit breaker according to claim 1, wherein the arc splitter stack is arranged between an upper arc guide rail and a lower arc guide rail.

11. The miniature circuit breaker according to claim 1, wherein exhaust air from the first exhaust zone recirculates inside the miniature circuit breaker and returns to the arc extinguishing chamber.

12. A miniature circuit breaker comprising an arc extinguishing device for a circuit-breaker, the arc extinguishing device comprising:

an arc splitter stack comprising a plurality of extinguishing splitter plates stacked on top of each other and spaced apart from each other in a direction of stacking; and an insulating rear plate fixed at a back of the arc splitter stack, the insulating rear plate being subdivided into a first vertical portion and a second vertical portion, each of the first and second vertical portions comprising respectively a first exhaust zone and a second exhaust zone, each exhaust zone comprising vents facing spaces between respective adjacent extinguishing splitter plates, wherein the first exhaust zone is located in an upper part of the first vertical portion and the second exhaust zone is located in a lower part of the second vertical portion, and wherein the arc extinguishing device is adapted to:

extinguish an electric arc generated in an arc extinguishing chamber, and direct exhaust air outgoing from the first exhaust zone to the arc extinguishing chamber.

13. The miniature circuit breaker according to claim 12, wherein the first and second exhaust zones are separated by a vertical partition wall arranged to prevent exhaust air flow between the first and second exhaust zones.

14. The miniature circuit breaker according to claim 12, wherein each vertical portion comprises respectively a first and a second insulation zone:

the first insulation zone being located in a lower part of the first vertical portion, below the first exhaust zone, the second insulation zone being located in an upper part of the second vertical portion, above the second exhaust zone.

15. The miniature circuit breaker according to claim 12, wherein the insulating rear plate comprises one or more positioning ribs adapted to be inserted between adjacent extinguishing splitter plates.

16. The miniature circuit breaker according to claim 12, wherein the first exhaust zone and the second exhaust zone have a same width.

17. The miniature circuit breaker according to claim 12, wherein the miniature circuit breaker is configured to direct the exhaust air outgoing from the second exhaust zone to an exhaust vent of the miniature circuit breaker.

18. The miniature circuit breaker according to claim 12, wherein the first exhaust zone and the second exhaust zone overlap in a middle of the insulating rear plate.

19. The miniature circuit breaker according to claim 12, wherein a vent faces each space between adjacent extinguishing splitter plates.

20. The miniature circuit breaker according to claim 12, wherein the arc splitter stack is arranged between an upper arc guide rail and a lower arc guide rail.

* * * * *